(12) United States Patent
Patel et al.

(10) Patent No.: US 9,331,925 B2
(45) Date of Patent: May 3, 2016

(54) MULTIPLE TEST SITE BANDWIDTH LIMIT MEASUREMENT

(71) Applicant: Cisco Technology, Inc., San Jose, CA (US)

(72) Inventors: Rahul Patel, Fremont, CA (US); Sanjay Sreenath, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 126 days.

(21) Appl. No.: 13/797,256

(22) Filed: Mar. 12, 2013

(65) Prior Publication Data

US 2014/0269399 A1    Sep. 18, 2014

(51) Int. Cl.
  *H04L 12/26*    (2006.01)
(52) U.S. Cl.
  CPC ............ *H04L 43/10* (2013.01); *H04L 43/0888* (2013.01)
(58) Field of Classification Search
  USPC .......................... 370/231–234, 236, 241–253
  See application file for complete search history.

(56) References Cited

U.S. PATENT DOCUMENTS

| | | | | |
|---|---|---|---|---|
| 7,242,668 B2* | 7/2007 | Kan et al. | ...................... | 370/234 |
| 7,627,675 B2* | 12/2009 | Bernstein et al. | ............. | 709/225 |
| 7,835,293 B2* | 11/2010 | Cidon et al. | .................. | 370/248 |
| 8,116,224 B2* | 2/2012 | Bugenhagen | .................. | 370/252 |
| 8,130,661 B2* | 3/2012 | Kannan et al. | ................ | 370/252 |
| 2002/0080726 A1* | 6/2002 | Klassen et al. | ................ | 370/252 |
| 2010/0208613 A1* | 8/2010 | Oba et al. | ........................ | 370/253 |
| 2010/0280858 A1* | 11/2010 | Bugenhagen | ...................... | 705/7 |
| 2011/0222405 A1* | 9/2011 | Bugenhagen | ................. | 370/235 |
| 2012/0128000 A1* | 5/2012 | Baillargeon | ............ | H04L 43/10 370/392 |
| 2013/0347103 A1* | 12/2013 | Veteikis | .................... | H04L 1/24 726/22 |
| 2014/0126413 A1* | 5/2014 | Bugenhagen | ................. | 370/252 |

* cited by examiner

*Primary Examiner* — Awet Haile
*Assistant Examiner* — Kent Krueger
(74) *Attorney, Agent, or Firm* — Hickman Palermo Becker Bingham LLP (57) ABSTRACT

In one embodiment, methods are described to measure bandwidth limits through multiple test sites. A testing quantity of network packets is generated, the network packets are sent through a service provider network to a plurality of receivers at a testing transmission rate that exceeds an upstream transmission rate limit of the service provider network, a report indicating a received number of packets is received from each of the plurality of receivers, and an upstream transmission rate limit of the service provider network is determined based on the testing transmission and the reports. By using multiple test sites, potential bottlenecks at any one test site are reduced. A similar method can be used to calculate a downstream transmission rate limit. Once measured, the bandwidth limits may be used to adjust quality of service on an edge router or compared against a known service level agreement of the service provider network.

18 Claims, 5 Drawing Sheets

212
REQUEST A TESTING QUANTITY OF NETWORK PACKETS TO BE SENT AT A TESTING TRANSMISSION RATE FROM A PLURALITY OF SENDERS

214
RECEIVE THE NETWORK PACKETS THROUGH A SERVICE PROVIDER NETWORK FROM THE PLURALITY OF SENDERS, WHEREIN THE TESTING TRANSMISSION RATE OF THE PLURALITY OF SENDERS COLLECTIVELY EXCEEDS A DOWNSTREAM TRANSMISSION RATE LIMIT OF THE SERVICE PROVIDER NETWORK

216
GENERATE A REPORT INDICATING A RECEIVED NUMBER OF PACKETS FROM EACH OF THE PLURALITY OF SENDERS

218
DETERMINE THE DOWNSTREAM TRANSMISSION RATE LIMIT OF THE SERVICE PROVIDER NETWORK BASED ON THE TESTING TRANSMISSION RATE AND THE REPORT

FIG. 3

MULTIPLE TEST SITE BANDWIDTH LIMIT MEASUREMENT

TECHNICAL FIELD

The present disclosure generally relates to bandwidth measurement in a network. The disclosure relates more specifically to multiple test site bandwidth limit measurement.

BACKGROUND OF THE DISCLOSURE

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Customers may access computer networks such as the Internet by entering into service agreements with one or more service providers. For enterprise customers, each service provider may define the customer relationship with a service level agreement (SLA), which may include minimum service guarantees and any remedies available to the customer if those guarantees are not met.

Example service guarantees in a SLA include minimum uptime and availability, minimum latency, minimum upstream and downstream bandwidth, and other parameters. Additionally, the service guarantees may vary according to specific traffic classes, for example by Differentiated Services Code Point (DSCP) values specified in network packets.

DESCRIPTION OF EXAMPLE EMBODIMENTS

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Embodiments are described herein according to the following outline:

1.0 Overview
2.0 Structural Overview
3.0 Functional Overview
    3.1 Multiple Test Site Upstream Bandwidth Limit Measurement
    3.2 Multiple Test Site Downstream Bandwidth Limit Measurement
4.0 Implementation Mechanisms—Hardware Overview
5.0 Extensions and Alternatives

1.0 OVERVIEW

A method for multiple test site bandwidth measurement is presented. In an embodiment, a testing quantity of network packets is generated, the network packets are sent through a service provider network to a plurality of receivers at a testing transmission rate that exceeds an upstream transmission rate limit of the service provider network, a report indicating a received number of packets is received from each of the plurality of receivers, and an upstream transmission rate limit of the service provider network is determined based on the testing transmission rate and the reports.

In an embodiment, a testing quantity of network packets is requested to be sent at a testing transmission rate from a plurality of senders, the network packets are received through a service provider network from the plurality of senders such that the testing transmission rate exceeds a downstream transmission rate limit of the service provider network, a report is generated indicating a received number of packets from each of the plurality of senders, and the downstream transmission rate limit of the service provider network is determined based on the testing transmission rate and the report.

In other aspects, embodiments provide a computer apparatus and a computer-readable medium configured to carry out the foregoing methods.

2.0 STRUCTURAL OVERVIEW

Figure 1A:
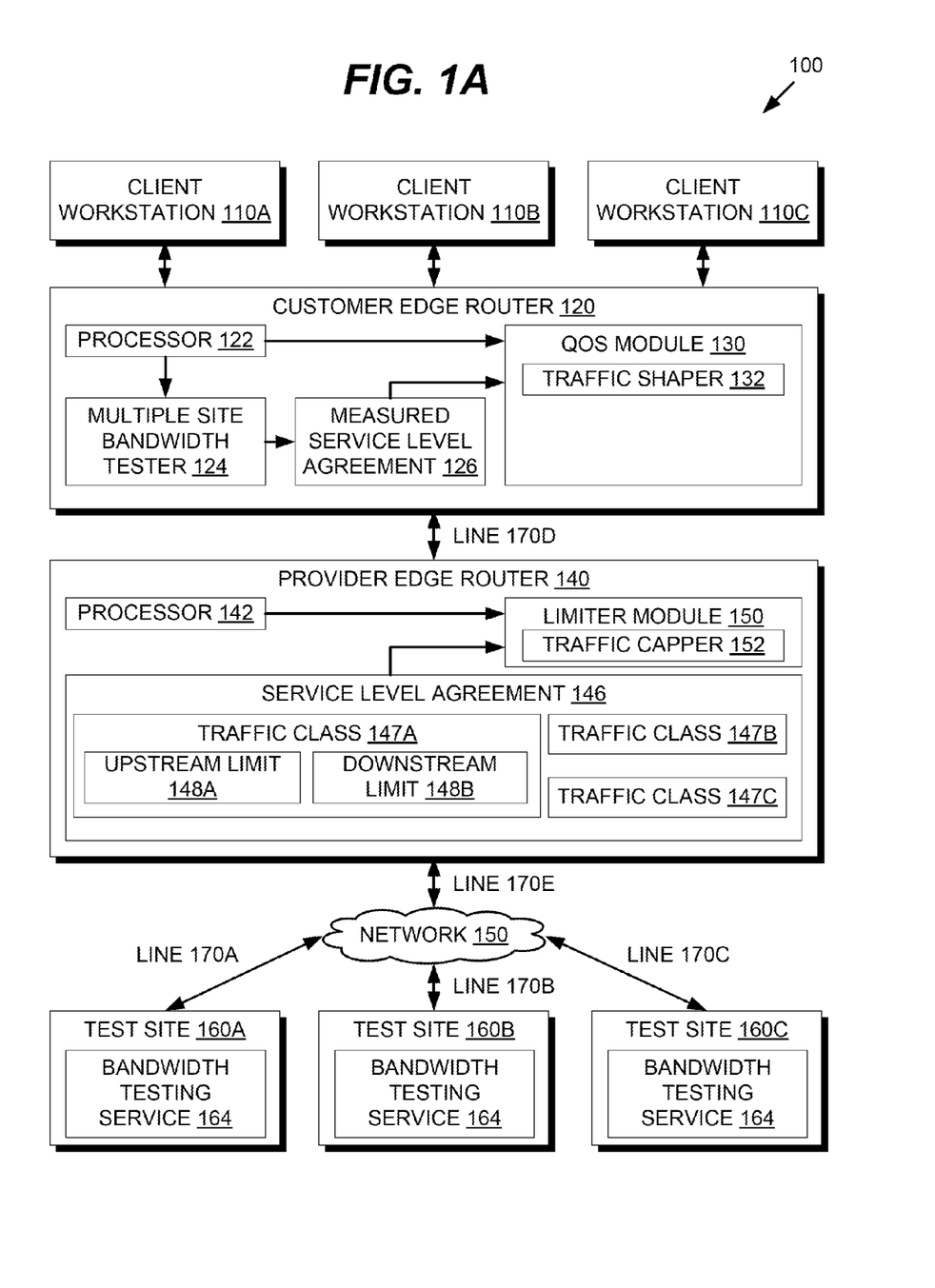
FIG. 1A illustrates an example network for multiple test site bandwidth measurement.

FIG. 1A illustrates an example network for multiple test site bandwidth measurement. Diagram 100 of FIG. 1A includes client workstation 110A, client workstation 110B, client workstation 110C, customer edge router 120, provider edge router 140, network 150, test site 160A, test site 160B, test site 160C, line 170A, line 170B, line 170C, line 170D, and line 170E.

Client workstations 110A, 110B, 110C may comprise any kind of computing device including a personal computer, workstation, laptop computer, netbook, tablet computer, or mobile computing device. Routers 120, 140 may comprise any form of packet data router. Network 150 broadly represents one or more networks or internetworks.

Customer edge router 120 includes processor 122, multiple site bandwidth tester 124, measured service level agreement 126, and QoS module 130. QoS module 130 includes traffic shaper 132. Each of the multiple site bandwidth tester 124, measured service level agreement 126, QoS module 130 and traffic shaper 126 may be implemented using one or more computer programs, other software elements, firmware or a combination that are hosted in or executed by the router 120 as either a general-purpose router or a special-purpose router.

Provider edge router 140 includes processor 142, service level agreement 146, and limiter module 150. Limiter module 150 includes traffic capper 152. Service level agreement 146 includes traffic class 147A, traffic class 147B, and traffic class 147C. Traffic class 147A includes upstream limit 148A and downstream limit 148B. Test site 160A-160C each includes bandwidth testing service 164. Limiter module 150 and traffic capper 152 may be implemented, in various embodiments, as one or more computer programs, other software elements, firmware, or a combination, hosted by or executed in either a general-purpose router or a special-purpose router.

Customer edge router 120 may be a wide area network (WAN) edge device that provides Internet connectivity for a customer site. As shown in FIG. 1A, client workstations 110A-110C connect to customer edge router 120. While FIG. 1A shows a simplified network configuration where only three client workstations connect directly to customer edge router 120, alternative embodiments may include more complicated configurations with any number of client devices, switches, routers, hubs, and other network nodes. Additionally, while multiple customer edge routers and multiple provider edge routers may be utilized, only a single customer edge router 120 and a single provider edge router 140 are shown in FIG. 1A for simplicity. Further, while test sites 160A-160C are shown to connect directly to network 150 via lines 170A-170C, additional provider edge routers may also be present between test sites 160A-160C and network 150.

While a customer may receive a stated copy of service level agreement 146 as a starting point for configuring customer edge router 120 for Quality of Service (QoS) and traffic shaping, the accuracy of the stated copy is taken at the word of the service provider. The customer cannot discover any service guarantee violations until the connection is actually tested. Thus, relying solely on a stated copy of a SLA may result in a misconfiguring of customer edge router 120, particularly with settings reliant on upstream and downstream bandwidth, increasing the risk for dropped packets at provider edge router 140.

Furthermore, in some situations, a stated copy of service level agreement 146 may not be specifically provided to the customer, for example as with a digital subscriber line (DSL) connection or a cable Internet connection. In these cases, the service provider might not guarantee a minimum level of service, and the service level might be dynamically adjusted for network load balancing or other purposes. Thus, the specific service level at any given time is unknown.

Regardless of whether a stated copy of service level agreement 146 is provided, the customer cannot verify whether the service provider is providing a specific level of service unless the connection is actually tested by the customer. A point-to-point connection between two nodes may be tested to determine the service level on a specific service provider. However, this approach breaks down and provides inaccurate results when network congestion and bottlenecks are encountered between links in the point-to-point connection. Without having an accurate measurement of actual service levels from service providers, particularly upstream and downstream bandwidth, it is difficult to configure customer edge routers, such as customer edge router 120, for optimal network performance and to hold service providers accountable for their SLAs.

Accordingly, customer edge router 120 may execute multiple site bandwidth tester 124 on processor 122 to initiate a multiple test site bandwidth test, as described in greater detail below in Section 3.0. After the bandwidth test is completed, the results are provided as measured service level agreement 126. Measured service level agreement 126 may contain elements similar to those shown in service level agreement 146, but with values reflecting actual measured network conditions. Additionally, since measured service level agreement 126 is calculated by using multiple test sites rather than a single point-to-point test connection, the customer will have greater confidence that any measured bandwidth limits are the direct result of limiter module 150 since network bottlenecks at any one particular test site can be reduced or eliminated as factors.

Once measured service level agreement 126 is calculated, various tasks may be initiated. One task may be to adjust QoS module 130 according to measured service level agreement 126. For example, incoming traffic from client workstations 110A-110C may be shaped and queued by traffic shaper 132 according to measured available upstream bandwidth. Traffic shaper 132 may also drop packets as well. In this manner, traffic can be managed ahead of time at the customer side rather than relying on provider edge router 140 to drop packets in an unpredictable and uncontrolled fashion.

If service level agreement 146 is available to the customer, then another task may be to compare measured service level agreement 126 to service level agreement 146. If a difference from the comparing exceeds a threshold, then an action may be performed such as generating a report or a notification. In this manner, a customer can determine whether a service provider is actually providing promised service levels and can take corrective action accordingly.

Provider edge router 140 is an edge device on the provider network side, providing customers with access to a larger network 150, such as the Internet. Provider edge router 140 utilizes limiter module 150 to enforce service level agreement 146. As shown in FIG. 1A, service level agreement 146 defines service levels according to different traffic classes 147A-147C. For example, traffic class 147A may be directed towards general bulk data traffic, traffic class 147B may be directed towards Voice over Internet Protocol (VOIP) traffic, and traffic class 147C may be directed towards transactional database traffic. Each traffic class may be assigned a particular allocation of upstream and downstream bandwidth, as shown by upstream limit 148A and downstream limit 148B in traffic class 147A. Network packets belonging to these traffic classes may include corresponding differentiated services code point (DSCP) values, which may be marked by a traffic classifier at customer edge router 120 or specified by the originating host.

Traffic capper 152 may examine incoming network packets, match DSCP values to the corresponding traffic class in service level agreement 146, and cap traffic by dropping network packets if the defined bandwidth limit has been exceeded. To allow for short bursts of traffic that may temporarily exceed the bandwidth limits, service level agreement 146 may also define an available burst size for each traffic class. Traffic capper 152 may thus be implemented using upstream and downstream token buckets for each traffic class, which are initially sized and filled to the defined burst size and replenished at the rate of the defined bandwidth limits.

Before the multiple site bandwidth tester 124 can proceed, suitable test sites need to be identified. Test sites may be discovered by using any suitable method, for example by using Cisco Service Advertisement Framework (SAF) peering mechanisms. Accordingly, test sites 160A-160C can be discovered by multiple site bandwidth tester 124, which then communicates with bandwidth testing service 164 hosted on each test site to carry out the multiple site bandwidth test.

3.0 FUNCTIONAL OVERVIEW

Figure 1B:
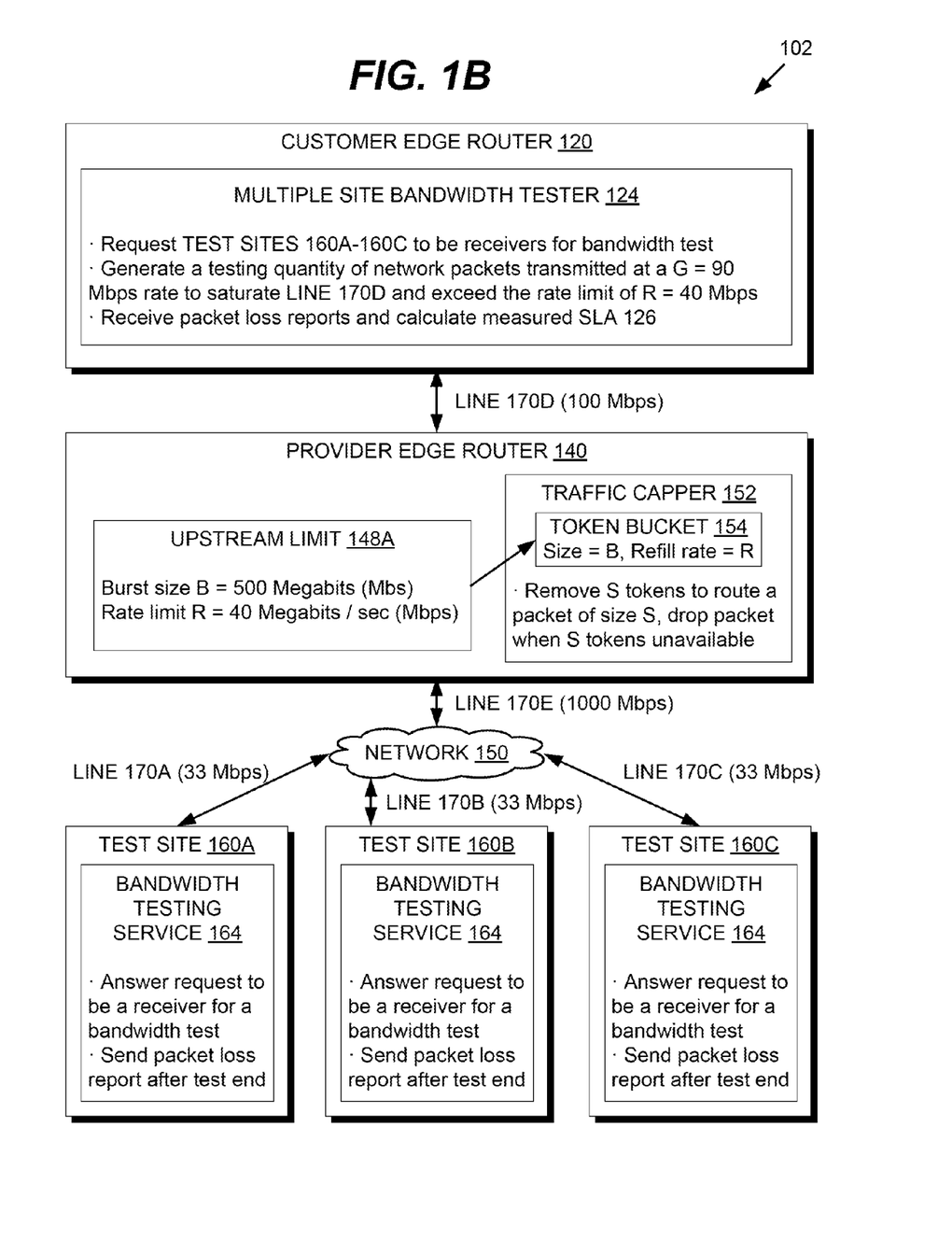
FIG. 1B illustrates data flow processes in an example network for multiple test site bandwidth measurement.

FIG. 1B illustrates data flow processes in an example network for multiple test site bandwidth measurement. Diagram 102 of FIG. 1B includes customer edge router 120, provider edge router 140, network 150, test site 160A, test site 160B, test site 160C, line 170A, line 170B, line 170C, line 170D, and line 170E. Customer edge router 120 includes multiple site bandwidth tester 124. Provider edge router 140 includes upstream bandwidth 184A and traffic capper 152. Traffic capper 152 includes token bucket 154. Test site 160A-160C each includes bandwidth testing service 164.

To illustrate a specific example, FIG. 1B is illustrated with various example data values for use in measuring an upstream bandwidth limit by multiple test sites. Starting at customer edge router 120, multiple site bandwidth tester 124 begins by requesting test sites 160A-160C to function as receivers for a bandwidth test. As previously discussed, any suitable method may be used to identify the test sites, such as SAF peering.

Bandwidth testing service 164 at each test site confirms the request and prepares to receive the network packets.

Next, a testing quantity of network packets is transmitted at a high G=90 Mbps rate to saturate line 170D. The testing quantity should be large enough to deplete token bucket 154 and initiate sustained packet losses from traffic capper 152 for a sufficient measurement time period. For example, the testing quantity may be set such that the bandwidth test runs for 20 seconds, where token bucket 154 is depleted after 10 seconds. The testing transmission rate G is preferably set to the line rate of the edge WAN device. It may not be possible to completely saturate line 170D at the line rate, but with hardware acceleration or assistance at customer edge router 120, at least 90% of the line rate should be attainable. By setting the transmission rate G at or close to the line rate, for example G=90 Mbps, the upstream rate limit R=40 Mbps should be easily exceeded, allowing token bucket 154 to be depleted for completing the bandwidth test.

Focusing on provider edge router 140, it can be seen that an upstream limit 148A is enforced by traffic capper 152, where the customer is provided with a burst size B=500 megabits (Mb) and an upstream rate limit R=40 megabits/sec (Mbps). Since token bucket 154 is initially sized at B=500 Mb, it would take 500 Mb/90 Mbps, or 5 and 5/9 seconds to deplete the initial token allocation. However, since token bucket 154 is also refilled at the rate of R=40 Mbps to implement upstream limit 148A, 10 seconds elapse before token bucket 154 is completely emptied. More specifically, with the testing transmission rate G=90 Mbps, 90 Mbps*10 sec or 900 Mb worth of tokens are removed from token bucket 154 after 10 seconds, matching the token allocation of B+R(time elapsed), or 500+40(10)=900 Mb. Accordingly, token bucket 154 is completely empty after 10 seconds of conducting the bandwidth test, and any packet losses after 10 seconds can be attributed to traffic capper 152 enforcing rate limit R.

After the set testing quantity of network packets are sent, then reports may be received from the bandwidth testing service 164 of test sites 160A-160C. The reports may be requested by customer edge router 120, or they may be sent automatically by test sites 160A-160C. For example, test sites 160A-160C may be informed of the number of network packets to be sent for the test, allowing test sites 160A-160C to estimate the ending time for the test.

At the least, the reports indicate the number of packets received at each receiving test site, and thus the number of packets lost as well, since the testing quantity is known. If the network packets include sequence numbers, then more detail can be provided in the reports. For example, the number of packets may be specific for the last X number of received packets, where X is a predetermined number, for example 100 or more. This allows the bandwidth calculation to be based on the tail-end sustained loss period rather than the initial burst period, or the first 10 seconds for FIG. 1B. More detailed packet loss information can also be provided from the sequence numbers and the receipt time of each packet, allowing the burst size to be identified more precisely and irrelevant packet losses to be ignored. A measured service level agreement 126 can then be calculated by using the reports and the testing transmission rate G.

Note that the use of a single point-to-point test site may result in an inaccurate bandwidth limit calculation. For example, as shown in FIG. 1B, each test site may have a relatively low bandwidth connection to network 150, or 33 Mbps as indicated by lines 170A, 170B, and 170C. If a single test site 160A were used, then packet losses may result due to the 33 Mbps bottleneck at line 170A, which cannot support the sustained rate limit of R=40 Mbps. Packets may thus be dropped at a provider edge router (not shown in FIG. 1B) connected to test site 160A, or packets may be dropped at another node within network 150. These packet losses would in turn skew the calculation of the measured service level agreement 126, since a smaller portion of the packet losses are actually attributable to traffic capper 152.

On the other hand, since multiple site bandwidth tester 124 sends data packets to multiple test sites 160A-160C, which have a combined 33+33+33=99 Mbps connection to network 150, the rate limit of R=40 Mbps and the transmission testing rate of G=90 Mbps can be readily accommodated, and the majority of packet losses can thus be attributed to traffic capper 152, leading to a more accurate bandwidth limit calculation. Thus, the use of multiple test sites or a plurality of receivers reduces the effect of potential bottlenecks at the receiving end, since lost packets are more likely to result from bandwidth limiting at the service provider network rather than from individual bottlenecks at a single receiver.

As a default setting, multiple site bandwidth tester 124 may send an equal proportion of packets for each test site. Thus, for FIG. 1B, test sites 160A-160C may each receive approximately ⅓ of the testing quantity of network packets. If the line limits for each test site are known to vary, then the proportion of packets sent to each test site may be adjusted accordingly from the default equal proportion.

The specific number of test sites to be utilized by multiple site bandwidth tester 124 may be based on an estimated value for R, a number of test sites available, and the line limits for the test sites, if known.

3.1 Multiple Test Site Upstream Bandwidth Limit Measurement

Figure 2A:
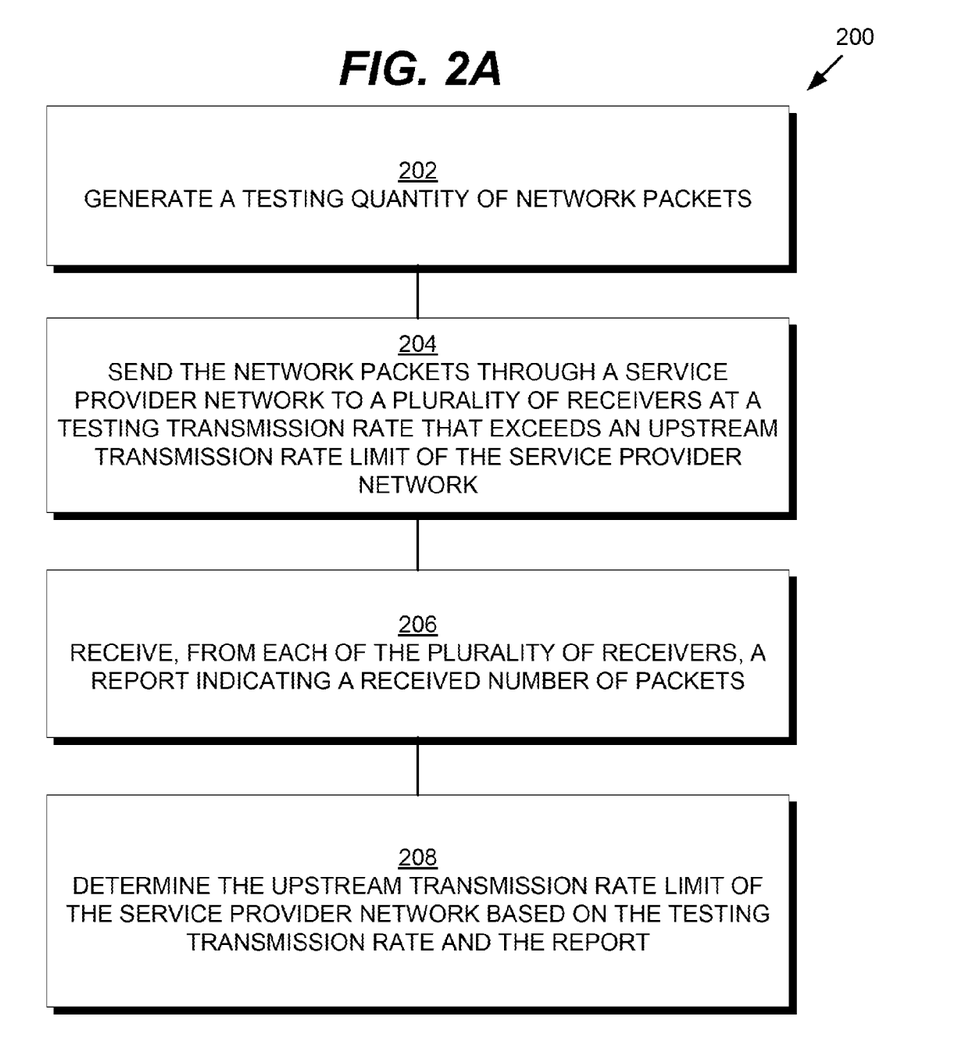
FIG. 2A illustrates a method for multiple test site upstream bandwidth measurement.

FIG. 2A is a flow diagram illustrating a method for multiple test site upstream bandwidth measurement. For purposes of illustrating a clear example, FIG. 2A may be described with reference to FIG. 1A; however, the process of FIG. 2A may be used in many other networking arrangement and contexts.

In block 202 of process 200, a testing quantity of network packets is generated. As an example, processor 122 of customer edge router 120 executes multiple site bandwidth tester 124 to generate a testing quantity of network packets. The testing quantity is sufficient to cause packet drops by traffic capper 152 of provider edge router 140.

The network packets are directed towards a plurality of receivers or test sites, and may include linearly increasing sequence numbers for each receiver. While the specific number of receivers for the bandwidth test may vary according to various factors, the present example will utilize all available test sites 160A-160C. By default, the network packets may be distributed in equal proportion to each test site. However, the proportions may also be adjusted if the capacities of lines 170A-170C are known.

Additionally, the network packets may be marked with a specific DSCP value to test the associated traffic class. Process 200 may then be repeated for each DSCP value associated with the traffic classes defined in service level agreement 146. If the bandwidth test results are largely similar despite running process 200 with different DSCP values, then the provider may not support DSCP for traffic differentiation and quality of service.

In block 204, the network packets are sent through a service provider network to a plurality of receivers at a testing transmission rate that exceeds an upstream transmission rate limit of the service provider network. For example, processor 122 of customer edge router 120 sends the network packets from block 202 through provider edge router 140 to test sites 160A-160C. The sending is at a testing transmission rate G that exceeds upstream limit 148A of provider edge router 140. To ensure that this condition is satisfied, it may be preferable to configure the transmission rate G to be at the rate of line 170D or at least 90% of line 170D, as illustrated by G in FIG. 1B. With a sufficient testing quantity of network packets, token bucket 154 is eventually depleted and sustained packet losses occur as a result of traffic capper 152 implementing upstream limit 148A.

In block 206, the process receives, from each of the plurality of receivers, a report indicating a received number of packets. For example, processor 122 of customer edge router 120 receives, from test sites 160A-160C, a report indicating a received number of packets. As previously discussed, the report can be specific for the last X number of received packets.

Furthermore, the report can contain detailed packet loss information. For example, the packet loss information may contain, for each receiver, an ordered list of the first N lost packets, where N is a predetermined number, for example 100. The ordered list of lost packets may be derived using the receipt times and sequence numbers from the network packets that are actually received the receiver. Each lost packet in the ordered list may indicate a time of receipt relative to the first packet received at the receiver.

The packet loss information can then be utilized to determine the burst size B with higher precision. The ordered lists for all receivers can be combined and sorted by increasing relative time. Duplicate or near duplicate relative time values may be discarded or consolidated. Then, the combined list is traversed until a periodic pattern is found. The start of the periodic pattern indicates the start of the sustained loss period, and therefore indicates the time T for the burst period.

For example, a combined list for FIG. 1B may have relative time values of 0.5, 2.0, 10, 15, and 20 seconds. The first two lost packets with relative times of 0.5 and 2.0 may be discarded and ignored, since they do not follow a periodic pattern. On the other hand, the next three lost packets with relative times of 10, 15, and 20 follow a periodic pattern increasing by 5. The start of the periodic pattern with a relative time of 10 indicates the time T of the burst period. Having this information, it is easy to derive the burst size if the upstream bandwidth limit R is known, which is derived at the end of process 200:

$B=T*(G-R)$ $B=10*(90-40)$ $B=500$ Mb

In block 208, the process determines the upstream transmission rate limit of the service provider network based on the testing transmission rate and the report. For example, processor 122 of customer edge router 120 determines the upstream transmission rate limit R of provider edge router 140 based on the testing transmission rate G and the reports from block 206. Since the reports also indicate the received number of packets, the reports also indicate a lost number of packets L as the testing quantity of network packets X is known. Additionally, as previously described, the received number of packets may be restricted to a last predetermined number of packets received at each receiver. Thus, X may be adjusted to the predetermined number. Assuming X=100 and L=55 and 5/9 for each of test sites 160A-160C, the fractional Net_Lost_Rate can be calculated as follows (note that 5/9 is simplified to 0.556):

Lost_Rate (for a single test site)=$L/X$

Lost_Rate (for a single test site)=55.556/100=0.55556

Net_Loss_Rate (for all test sites)=Sum(Lost_Rate)/ Num_of_Receivers

Net_Loss_Rate (for all test sites)=(0.55556+0.55556+ 0.55556)/3=0.55556

Having the Net_Loss_Rate, the upstream transmission rate limit R can be calculated as follows:

$R=G*(1-\text{Net\_Loss\_Rate})$ $R=90*(1-0.55556)$ $R=90*0.44444$ $R=40$ Mbps

Once R is known, it can be used to determine the burst size B, as described above. Additionally, various tasks may be initiated in response to calculating R as part of measured service level agreement 126. For example, QoS module 130 may be adjusted to integrate the newly measured upstream limit R. Accordingly, incoming traffic from network devices connected to customer edge router 120, or client workstations 110A-110C in FIG. 1A, can be shaped and targeted according to the measured upstream limit R from block 208.

If process 200 is specific to a particular DSCP value, then the adjustment to traffic shaper 132 may also be specific to the associated traffic class. Additionally, if the results of process 200 do not vary when applied to different DSCP values, then it may be determined that DSCP is unsupported by the service provider network.

Another task may be to compare the measured service level agreement 126 with the actual service level agreement 146, if available to the customer. If a sufficient threshold difference is found between the measured and actual agreements, then an action may be taken, for example sending a notification or an alert. In this manner, service providers can be held accountable to their service level agreement promises.

3.2 Multiple Test Site Downstream Bandwidth Limit Measurement

Figure 2B:
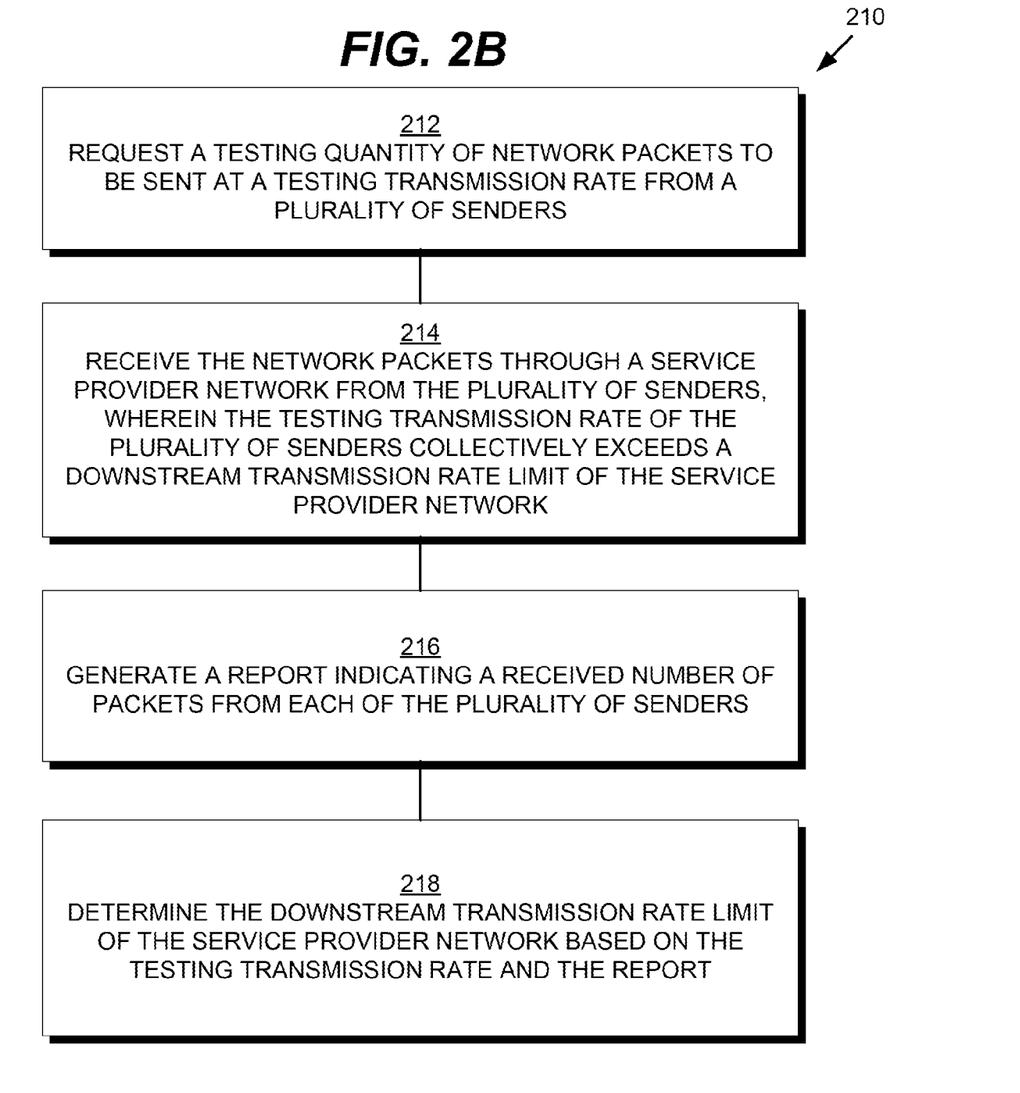
FIG. 2B illustrates a method for multiple test site downstream bandwidth measurement.

FIG. 2B is a flow diagram illustrating a method for multiple test site downstream bandwidth measurement. For purposes of illustrating a clear example, FIG. 2B is described herein with reference to FIG. 1A, but other embodiments may be implemented with other networking arrangements. Process 210 proceeds similarly to process 200, but instead requests and receives testing packets from a plurality of senders to measure a downstream rate limit. Accordingly, the network packets are generated at the test sites and received through the service provider network. The downstream transmission rate limit can be calculated by analyzing dropped packets, which may be determined based on sequence numbers embedded in the network packets.

With reference to FIG. 1A, in block 212, process 210 requests a testing quantity of network packets to be sent at a testing transmission rate from a plurality of senders. For example, processor 122 of customer edge router 120 executes multiple site bandwidth tester 124 to request a testing quantity of network packets to be sent at a testing transmission rate R from a plurality of senders, or test sites 160A-160C. The testing quantity is sufficient to cause packet drops by traffic capper 152 of provider edge router 140.

In block 214, the network packets are received through a service provider network from the plurality of senders, and the testing transmission rate of the plurality of senders collectively exceeds a downstream transmission rate limit of the service provider network. For example, processor 122 of customer edge router 120 receives the requested network packets through provider edge router 140 from test sites 160A-160C. The combined testing transmission rate R from test sites 160A-160C is high enough to exceed downstream limit 148B, or the specific downstream limit for an associated DSCP value in the network packets. For optimal testing conditions, each individual testing transmission rate should not exceed the upstream limit or the line limit of each test site.

In block 216, the process generates a report indicating a received number of packets from each of the plurality of senders. For example, processor 122 of customer edge router 120 generates a report indicating a received number of packets from each of test sites 160A-160C. To generate the report, processor 122 may first wait until at least one packet is received from each of the senders, or test sites 160A-160C. Afterwards, processor 122 may count a number of lost packets (L) out of an expected testing quantity of packets (X), similar to L and X in block 208 of process 200.

In block 218, the process determines the downstream transmission rate limit of the service provider network based on the testing transmission rate and the report. For example, processor 122 of customer edge router 120 determines the downstream transmission rate limit, for example as part of measured service level agreement 126, based on the testing transmission rate R and the report of block 216. The calculation may proceed similarly to block 208 of process 200, where Num_of_Receivers is replaced by Num_of_Senders.

4.0 IMPLEMENTATION MECHANISMS

Hardware Overview

Figure 3:
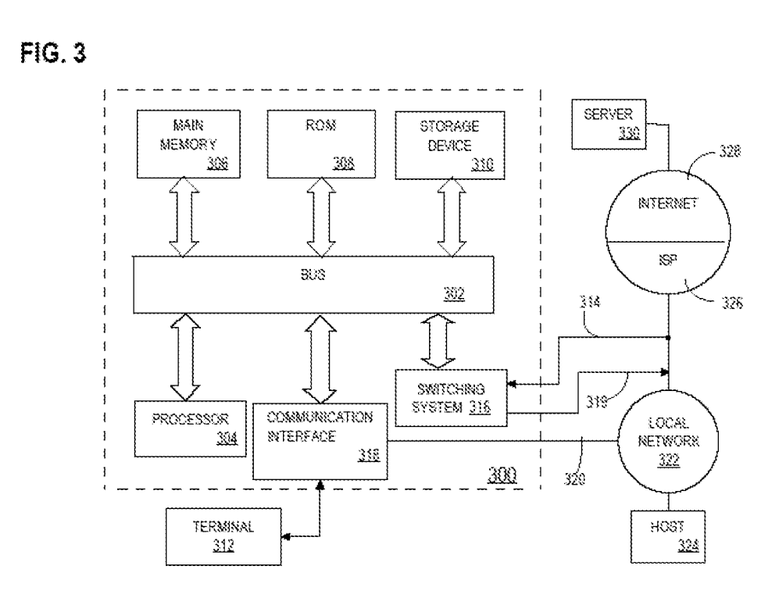
FIG. 3 illustrates a computer system upon which a method for multiple test site bandwidth measurement may be implemented.

FIG. 3 is a block diagram that illustrates a computer system 300 upon which an embodiment of the disclosure may be implemented. The preferred embodiment is implemented using one or more computer programs running on a network element such as a router device. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Communication interface 318 is a conventional serial interface such as an RS-232 or RS-422 interface. An external terminal 312 or other computer system connects to the computer system 300 and provides commands to it using the communication interface 318. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The disclosure is related to the use of computer system 300 for the techniques and functions described herein in a network system. According to one embodiment of the disclosure, such techniques and functions are provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the disclosure. Thus, embodiments of the disclosure are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with embodiments of the disclosure, one such downloaded application provides for the techniques and functions that are described herein.

The received code may be executed by processor 304 as it is received, and/or stored in storage device 310, or other non-volatile storage for later execution. In this manner, computer system 300 may obtain application code in the form of a carrier wave.

5.0 EXTENSIONS AND ALTERNATIVES

In the foregoing specification, the disclosure has been described with reference to specific embodiments thereof. It will, however, be evident that various modifications and changes may be made thereto without departing from the broader spirit and scope of the disclosure. The specification and drawings are, accordingly, to be regarded in an illustrative rather than a restrictive sense.

Any appropriate routing protocol and mechanism can be adopted to implement the disclosure. The method steps set out can be carried out in any appropriate order and aspects from the examples and embodiments described juxtaposed or interchanged as appropriate.

What is claimed is:

1. A data processing method comprising:
generating a testing quantity of network packets;
sending the network packets through a service provider network to a first receiver and a second receiver at a testing transmission rate that exceeds an estimated upstream transmission rate limit of the service provider network;
receiving, from the first receiver, a first report indicating a first received number of packets;
receiving, from the second receiver, a second report indicating a second received number of packets;
determining a first loss rate using the first report and a second loss rate using the second report;
determining a measured upstream transmission rate limit of the service provider network based on the testing transmission rate and an average of the first loss rate and the second loss rate;
wherein the method is performed by one or more computing devices.

2. The method of claim 1, wherein the first report further indicates packet loss information derived from a receipt time and a sequence number for each of the network packets received at the first receiver.

3. The method of claim 2, wherein the determining also determines a burst size of the service provider network.

4. The method of claim 1, wherein the first received number of packets is for a last predetermined number of network packets received at the first receiver.

5. The method of claim 1, wherein the one or more computing devices comprise a wide area network (WAN) edge device.

6. The method of claim 5, wherein the testing transmission rate is at least 90% of a line rate of the WAN edge device.

7. The method of claim 1, wherein each of the network packets includes a specific differentiated services code point (DSCP) value.

8. The method of claim 1 further comprising adjusting a quality of service (QoS) for network devices connected to the one or more computing devices in response to the determining of the upstream transmission rate limit.

9. The method of claim 1 further comprising comparing the upstream transmission rate limit to a service level agreement (SLA) of the service provider network and performing an action if a difference from the comparing exceeds a threshold.

10. A data processing method comprising:
requesting a testing quantity of network packets to be sent at a testing transmission rate from a first sender and a second sender;
receiving the network packets through a service provider network from the first sender and the second sender, wherein the testing transmission rate of the first sender and the second sender exceeds an estimated downstream transmission rate limit of the service provider network;
generating a first report indicating a first received number of packets from the first sender;
generating a second report indicating a second received number of packets from the second sender;
determining a first loss rate using the first report and a second loss rate using the second report;
determining a measured downstream transmission rate limit of the service provider network based on the testing transmission rate and an average of the first loss rate and the second loss rate;
wherein the method is performed by one or more computing devices.

11. The method of claim 10, wherein the one or more computing devices comprise a wide area network (WAN) edge device.

12. The method of claim 10, wherein each of the network packets includes a specific differentiated services code point (DSCP) value.

13. The method of claim 10 further comprising adjusting a quality of service (QoS) for network devices connected to the one or more computing devices in response to the determining of the downstream transmission rate limit.

14. The method of claim 10 further comprising comparing the downstream transmission rate limit to a service level agreement (SLA) of the service provider network and performing an action if a difference from the comparing exceeds a threshold.

15. A non-transitory computer-readable storage medium storing one or more instructions which, when executed by one or more processors, cause the one or more processors to perform:

generating a testing quantity of network packets;

sending the network packets through a service provider network to a first receiver and a second receiver at a testing transmission rate that exceeds an estimated upstream transmission rate limit of the service provider network;

receiving, from the first receiver, a first report indicating a first received number of packets;

receiving, from the second receiver, a second report indicating a second received number of packets;

determining a first loss rate using the first report and a second loss rate using the second report;

determining a measured upstream transmission rate limit of the service provider network based on the testing transmission rate and an average of the first loss rate and the second loss rate.

16. The non-transitory computer-readable storage medium of claim 15, wherein each of the network packets includes a specific differentiated services code point (DSCP) value.

17. The non-transitory computer-readable storage medium of claim 15 further comprising instructions which, when executed, cause the one or more processors to perform: adjusting a quality of service (QoS) for network devices in response to the determining of the upstream transmission rate limit.

18. The non-transitory computer-readable storage medium of claim 15 further comprising instructions which, when executed, cause the one or more processors to perform: comparing the upstream transmission rate limit to a service level agreement (SLA) of the service provider network and performing an action if a difference from the comparing exceeds a threshold.

* * * * *